Oct. 5, 1965 R. J. GIANNI 3,209,867

BRAKE FOR ROTARY CARD REEL

Filed April 15, 1964 2 Sheets-Sheet 1

INVENTOR
ROBERT J. GIANNI

BY E. F. Kane

ATTORNEY

Oct. 5, 1965 R. J. GIANNI 3,209,867

BRAKE FOR ROTARY CARD REEL

Filed April 15, 1964 2 Sheets-Sheet 2

INVENTOR
ROBERT J. GIANNI

BY E. A. Kane

ATTORNEY

United States Patent Office 3,209,867 Patented Oct. 5, 1965

3,209,867

BRAKE FOR ROTARY CARD REEL

Robert J. Gianni, Norridge, Ill., assignor to Teletype Corporation, Skokie, Ill., a corporation of Delaware Filed Apr. 15, 1964, Ser. No. 359,963
3 Claims. (Cl. 188—83)

This invention relates to brake mechanisms for card reels or magazines and more particularly to readily adjustable constant friction brakes for unevenly loaded card reels.

It is an object of the invention to provide an adjustable friction brake for a card supporting reel or magazine.

A further object of the invention is to provide mechanism for preventing an unevenly loaded card supporting reel from rotating to a position where most of the cards will be at the bottom of the reel.

A still further object of the invention is to prevent the weight of cards unevenly positioned in a card reel from applying destructive force to a card rocked or tilted out of the reel to a utilization device for the card.

In accordance with one embodiment of the invention a brake disc is mounted concentrically with a head member of the card reel and has a hub threaded into an extension of the shaft that serves as an axle of the reel, the brake disc being threadedly connected with the shaft of the reel, may be rotated to adjust the brake disc with respect to the head of the reel to compress an annular disc of a frictional material surrounding the hub in the area between the reel head and brake disc whereby when the reel is turned while the disc is free to be frictionally rotated with the reel head, the disc will be moved outwardly or away from the reel head to vary the frictional resistance between the head and disc and thereby adjust the resistance of the reel to rotation. The brake disc has associated with it a locking pin whereby after the reel is rotated to adjust the friction between it and the brake disc, the brake disc will be held in one of its rotative positions to maintain the frictional resistance constant.

Figure 1:
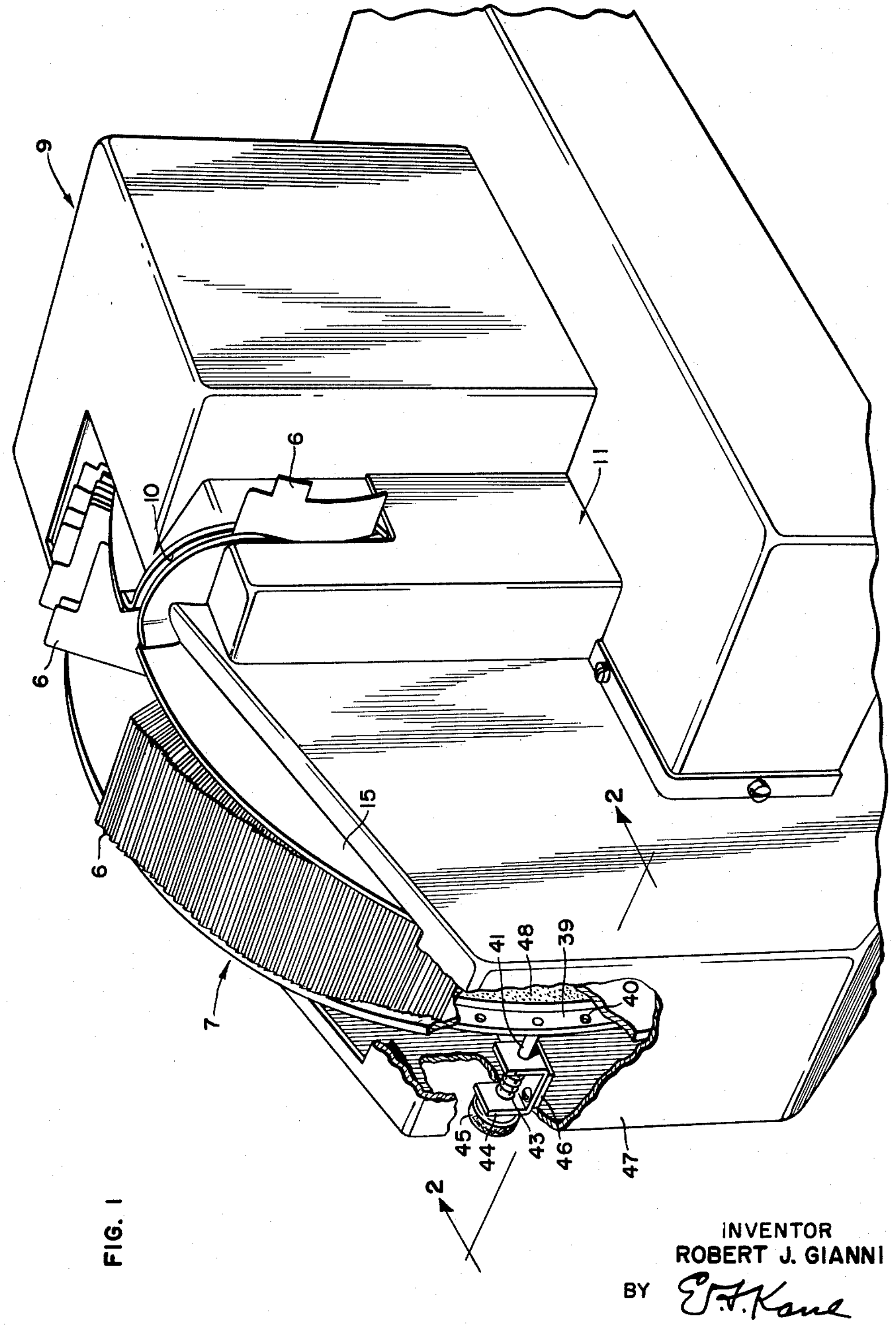
Figure 2:
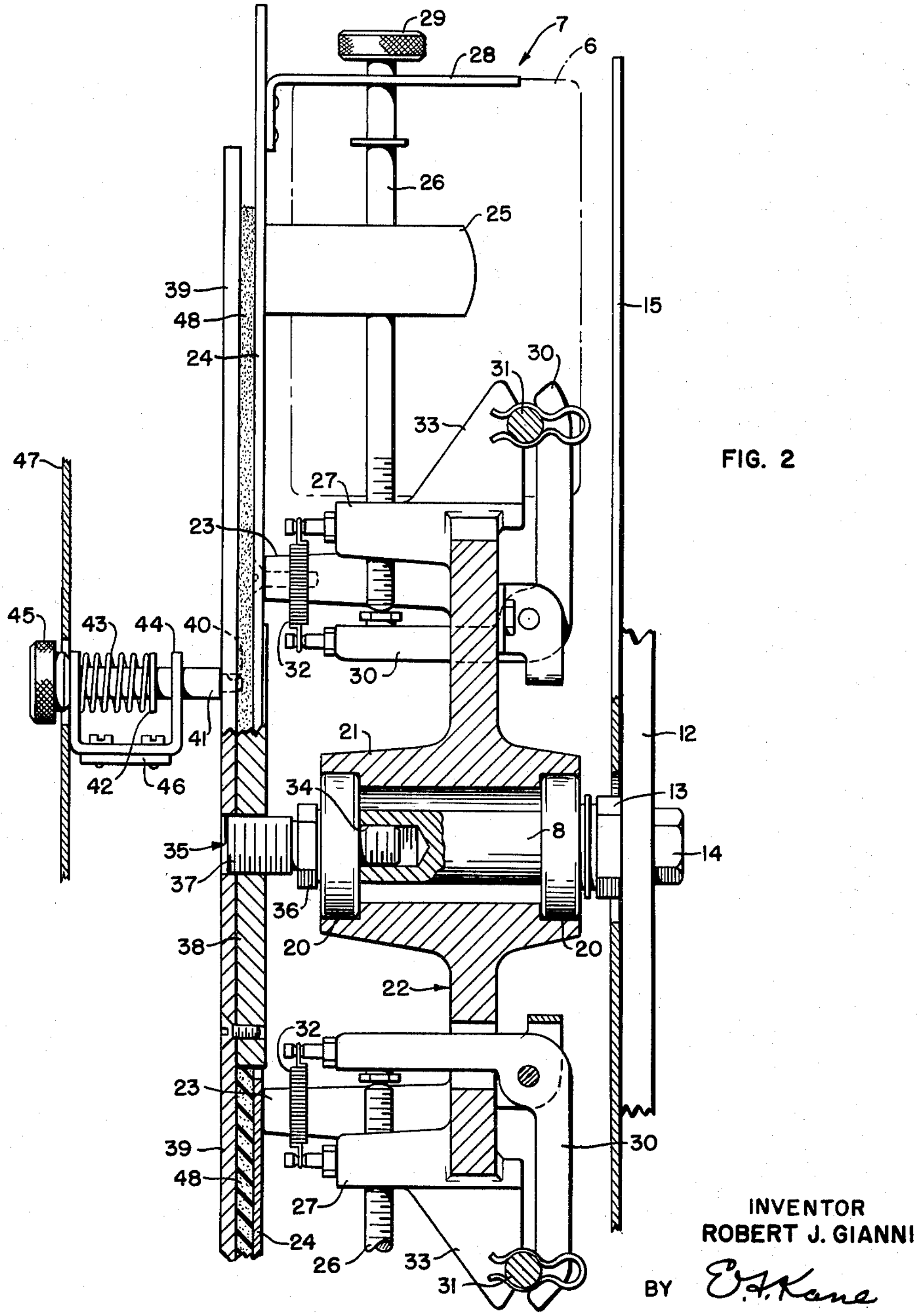

A more complete understanding of the invention may be had by reference to the following detailed description when considered in conjunction with the accompanying drawings wherein, FIG. 1 is a perspective view of a telegraph transmitter mechanism and its associated reader with the card reel cooperatively mounted on it, parts being broken away more clearly to illustrate features of the brake mechanism; and FIG. 2 is a view partly in section and partly in elevation and taken along the line 2—2 of FIG. 1 in the direction of the arrows showing the construction and details of the card reel and brake mechanism.

In the apparatus a plurality of cards 6 are supported in a rotatable reel or magazine 7 which is rotatably mounted on a fixed shaft 8. Each of the cards 6 is readily accessible to an operator for operative association with a transmitter mechanism designated generally by the numeral 9. The embodiment of the invention disclosed herein is particularly adaptable to a use with transmitter mechanism 9 of the type illustrated in Patent No. 3,014,093, issued Dec. 19, 1961 to W. J. Zenner. In card reels or magazines of the type used with such apparatus it is necessary to provide facilities for adding or removing cards from the reel and for supporting the cards so that they may be tilted or rocked with respect to the reel to enter them into a card slot 10 of a card reader 11. Preferably the shaft 8 is attached to a portion 12 of the framework of the transmitter 9 by means of cooperating nuts 13 and 14. The shaft 8 is thus held locked in a horizontal position perpendicular to a wall 15 which is also attached to the framework 12.

The shaft 8 has bearings 20 fixed to it for rotatably supporting the hub 21 of a web or flange 22 having peripherally spaced head plate supporting projections 23 formed on it. A head plate 24 is suitably attached to the projections 23 and carries six U-shaped guide brackets 25 which divide the reel into six equal compartments and serve to hold the cards 6 out of engagement with six threaded rods 26. The rods 26, at their inner ends, are threaded into laterally extending projections 27 formed on the web 22 and at their outer ends are guided by guide plates 28 suitably fixed to the head plate 24. The upper ends of the rods have knurled heads 29 formed on them whereby they may be manipulated to rock L-shaped clamping levers 30 into clamping engagement with arcuate shaped card support rods 31.

There are three of the rods 31 provided, as is true in the structure of the Zenner patent previously identified, and these rods 31 may be clamped by the clamping levers 30 against the action of springs 32 into engagement with ears 33 formed on the web 22. The rods 31 may be removed to either add or remove cards 6 from the card reel and it should be obvious that the addition to or removal of cards 6 from the reel may result in more cards being mounted in one sector of the reel than in any of the others. This would normally cause the reel to rotate to a position where the greatest number of cards would always be at the bottom of the reel. Thus an operator in using the reel to align cards with the slot 10 in the card reader 11 would in most operations, have to rotate the reel through one-half of a revolution to align a card that the operator intended to use with the slot 10.

Since the variation of the distribution of cards about the reel would change frequently it is highly desirable to provide a readily adjustable and infinitely variable brake for resisting the rotation of the reel by an unevenly displaced load of cards 6.

The left end (FIG. 2) of the shaft 8 has a threaded central aperture 34 into which there is threaded a shouldered, threaded post 35. This post 35 is locked in position in the shaft 8 by a lock nut 36 and has an enlarged portion 37 on which there is threaded a hub member or plate 38. The hub plate 38 has a brake disc 39 fixed to it which is substantially larger in diameter than the hub plate 8 and which is provided with a series of locking apertures 40, equally placed about it adjacent to its periphery, into which the reduced end of a locking pin 41 may be entered. The locking pin 41 has a collar 42 fixed to it intermediate its ends for engagement by a compression spring 43 that is under compression between the collar 42 and one leg of a U-shaped member 44 which slidably supports the locking pin 41 in alignment with the series of locking apertures 40 formed in the brake disc 39. The locking pin 41 is provided with a head portion 45 whereby it may be manipulated against the action of the spring 43 to retract its reduced end portion from the apertures 40 in the brake disc 39. The U-shaped member 44 is suitably mounted on an extension 46 of the framework of the transmitter mechanism 9 and extends through a casing 47 which partially encloses the card reel or magazine 7.

An annular disc of compressible friction material 48 surrounds the hub plate 38 and is positioned between the head plate 24 and brake disc 39. Preferably this disc 39 comprises a thin sheet of expanded polyurethane which has the quality of high friction coefficient and compressive elasticity, so that it will exert a suitable frictional force on the head plate 24, that may be varied by the amount that the disc 39 is compressed. Such a disc will return substantially to its completely expanded condition upon release of the compressive force on it.

If it be assumed that the card magazine or reel 7 has relatively few cards 6 in it, the reel will remain in any position to which it is manually rotated without much braking force being applied to it and consequently an operator using the apparatus may want the reel to turn relatively freely. If, in the opinion of the operator, the effort necessary to rotate the reel is too great, the operator may grasp the head portion 45 of the locking pin 41 and retract the reduced end of the pin 41 from any aperture 40 in which it had been entered and may then rotate the head plate 24 in a clockwise direction (FIG. 1). The friction disc 48 will rotate with the head plate 24 and will frictionally drive the brake disc 39 in a clockwise direction to drive the hub member or plate 38 clockwise about the enlarged threaded portion 37 of the hub member 35 until substantially no compressive force is being exerted on the friction disc 48 by the brake disc 39 and head plate 24. When this occurs the brake disc will no longer rotate with the head plate. To reduce the tendency of the reel or magazine 7 to rotate because of the unequal loading of the cards 6 in it, the pin 41 may again be retracted and the head plate 24 rotated counterclockwise to thread the hub plate 38 to the right on the enlarged portion 37 of the hub member 35. When the desired amount of friction has been applied to the head plate 24 by thus increasing the compressive force on the disc 48, the pin 41 may be released and entered into one of the locking apertures 40.

Although a particular embodiment of the invention is shown in drawings and described in the foregoing specification it will be understood that the invention is not limited to that specific embodiment, but is capable of modification and rearrangement, and substitution of parts and elements without departing from the scope of the invention.

What is claimed is:

1. The combination with a rotary card reel mounted for rotation on a fixed horizontal shaft and having a head plate, of mechanism for applying a braking force to retard rotation of the file under the influence of an unequally distributed load of cards consisting of, a brake hub threaded on said shaft, a brake disc fixed to said hub for rotating the hub to thread the hub toward and away from said head thereby to adjust the spacing between the head plate and brake disc, said brake disc having locking pin receiving apertures in it, an annular disc of expandable friction material surrounding said brake hub and positioned between the head plate and brake disc for exerting a braking force between the head plate and brake disc proportional to the spacing between the head plate and the brake disc, and a locking pin mounted in position to enter an aperture in the brake disc in position where the brake disc compresses the friction disc between the head plate and brake disc under a pressure determined by the direction and amount of rotation of the brake disc with respect to the shaft.

2. The combination with a rotary card reel mounted for rotation about a horizontal shaft and having a head plate and means for retaining a plurality of cards radially disposed in a circular array therein; of mechanism for compensating for the tendency of an unequally distributed load of cards to rotate the reel to a single position comprising, an annular brake disc having a flat face spaced from and parallel to a flat surface of said head plate and having a plurality of locking pin receiving apertures formed in a spaced circular pattern adjacent its periphery, a brake hub threaded on said shaft and fixed to the brake disc whereby rotation of the brake disc will advance or retract the hub on the shaft to move the brake disc toward or away from the head plate, an annular friction disc of expanded polyurethane supported on said brake hub in the space between the brake disc and head plate for frictional engagement with the brake disc and reel head, and a locking pin mounted in position to enter an aperture in the brake disc to lock the brake disc in position where it compresses the friction disc between the head plate and brake disc under a pressure determined by the direction and amount of rotation of the brake disc with respect to the shaft.

3. The apparatus according to claim 2 wherein the annular friction disc is carried by the hub, having its inner circular surface bearing on the peripheral surface of the hub for frictional rotation thereby when the faces of the friction disc and head plate do not frictionally block such rotation.

References Cited by the Examiner

UNITED STATES PATENTS

| | | | |
|---|---|---|---|
| 2,543,729 | 2/51 | Magida | 188—83 |
| 2,612,970 | 10/52 | Discount | 188—82.84 |
| 2,778,454 | 1/57 | Scholfield | 188—82.4 |
| 3,026,064 | 3/62 | Goodwin | 188—83 |
| 3,052,421 | 9/62 | Fischer | 188—83 X |

ARTHUR L. LA POINT, *Primary Examiner.*

EUGENE G. BOTZ, *Examiner.*